United States Patent Office 3,636,127
Patented Jan. 18, 1972

3,636,127
OLEFIN ISOMERIZATION PROCESS
Frederick C. Ramquist, Stickney, and Richard C. Wacker, Des Plaines, Ill., assignors to Universal Oil Products Company, Des Plaines, Ill.
No Drawing. Filed Nov. 3, 1969, Ser. No. 873,512
Int. Cl. C07c 5/24
U.S. Cl. 260—683.2                    9 Claims

ABSTRACT OF THE DISCLOSURE

Isomerizable olefins, in admixture with polymerizable diolefins are isomerized without polymerization of the diolefins by the utilization of a crystalline aluminosilicate with at least a portion of its cation content provided by copper or zinc.

BACKGROUND OF THE INVENTION

The present invention pertains to a process for the isomerization of isomerizable olefins. More precisely, the present invention pertains to a process for the isomerization of isomerizable olefins present in admixture with polymerizable diolefins without inducing substantial polymerization of the diolefins. This process involves the utilization of a specific crystalline aluminosilicate catalyst to achieve this result.

Processes for the isomerization of olefins, such as the migration of the double bond and/or the rearrangement of the molecular carbon skeleton of the olefin, are well known to the art. These processes are utilized to improve the octane ratings of n-alpha-olefins by shifting the olefinic bond to a more internal position within the normal chain such as the isomerization of 1-hexene to 2-hexene or 3-hexene. Further uses of these processes involve the isomerization of 1-butene to isobutylene thereby increasing alkylate quality in conventional isobutane alkylation units or the isomerization of 2-methylbutene-2 to 2-methylbutene-1, a valuable isoprene precursor.

A frequent source of these olefins are catalytic cracking units or paraffin dehydrogenation units. Olefins from these sources often contain various amounts of diolefinic hydrocarbons such as butadiene or isoprene in admixture therewith which are usually removed before effecting isomerization reactions. This removal is particularly important when employing catalytic isomerization reactions since substantial polymerization of the diolefins can cause tarry residues to form which lower the effectiveness of the particular catalytic composite employed in the isomerization reaction and contaminate the desired product.

SUMMARY OF THE INVENTION

Accordingly, it is an object of this invention to provide a catalytic process for the isomerization of an isomerizable mono-olefin having in admixture therewith a diolefin. More particularly, it is an object of the invention to provide a process for isomerizing a diolefin containing mono-olefin by the use of a specific, solid catalytic composite effective in isomerizing the mono-olefin without inducing substantial polymerization of the diolefin contained in admixture with the mono-olefin.

An olefin isomerization process has now been discovered which uses a catalytic composite that is effective in isomerizing a diolefin containing mono-olefin without inducing substantial polymerization of the diolefin. This catalyst comprises a crystalline aluminosilicate having at least a portion and preferably at least 20% of its cation content provided by copper or zinc.

In a broad embodiment, therefore, this invention pertains to a process for the isomerization of an isomerizable mono-olefin to an isomer thereof, in admixture with a diolefin, without substantial polymerization of the diolefin which comprises contacting said diolefin containing mono-olefin at isomerization conditions including a temperature of about 0° F. to 200° F. with a catalytic composite comprising a crystalline aluminosilicate with uniform pore openings. These pore openings must be of sufficient diameter to allow the passage of the iomerizable mono-olefin and the desired isomerization product therethrough. An additional essential requirement of the catalyst is that at least a portion, and preferably, at least 20% of the cation content is provided by copper or zinc. In a further more limited embodiment, the isomerization conditions are correlated so as to maintain the majority and preferably the entire diolefin containing olefin in the liquid phase. In a more specific embodiment, the crystalline aluminosilicate employed as a catalytic composite is a type X zeolite, preferably prepared by cation exchange with the calcium form.

Other objects and embodiments referring to specific isomerizable olefins, diolefins, and catalytic composites will be found in the following more detailed description of the process of the present invention.

DESCRIPTION OF PREFERRED EMBODIMENTS

The mono-olefins capable of utilization within the isomerization process of the present invention are generally a mixture of olefinic hydrocarbons of approximately the same molecular weight, including the 1-isomer, 2-isomer and other position isomers capable of undergoing isomerization to a mono-olefin in which the double bond occupies a more centrally located position in the hydrocarbon chain. The process of this invention thus can be used to provide an olefinic feed stock for motor fuel alkylation purposes containing an optimum amount of the more centrally located double bond olefin isomers, by converting the 1-isomer of near terminal position isomers into olefins where the double bond is more centrally located in the carbon atom chain. Thus the process of this invention is applicable to the isomerization of isomerizable mono-olefinic hydrocarbons such as the isomerization of 1-butene to 2-butene or the isomerization of 3-methyl-1-butene to 2-methyl-2-butene. In addition, the process of the present invention can be utilized to shift the double bond of an olefinic hydrocarbon such as 1-pentene, 1-hexene, 2-hexene and 4-methyl-1-pentene to a more centrally located position so that 2-pentene, 2-hexene, 3-hexene, and 4-methyl-2-pentene, respectively, can be obtained. It is not intended, however, to limit the process of this invention to these enumerated isomerizable olefinic hydrocarbons as it is contemplated that the shifting of a double bond to a more centrally located position may be effective in straight or branch chain olefinic hydrocarbons containing up to 20 carbon atoms or more per molecule. It is also not intended to limit the scope of this invention to isomerization processes wherein only the olefinic bond is isomerized to a new position but also where the skeletal arrangement of the hydrocarbon is also changed such as the isomerization of 1-pentene to 3-methyl-1-butene and/or 2-methyl-2-butene. Particularly preferred isomerizable olefins suitable for utilization in the process of the present invention are the $C_4$–$C_7$ mono-olefins.

These foregoing isomerizable mono-olefins may be derived as selective fractions from various naturally ocurring petroleum streams either as individual components or a certain boiling range fractions obtained by the selective fractionation and distillation of catalytically cracked gas oil. Thus, the process of the present invention may be successfully applied to and utilized for complete conversion of isomerizable olefins when these olefins are present in minor quantities in various fluid or gas streams. In other words these olefins, to be used in the processes of the present invention, need not be concentrated. For example, isomerizable olefins appear in minor quantities in various refinery streams usually diluted with such gases as hydrogen, nitrogen, methane, ethane, propane, etc. which would not be converted under the conditions hereinafter described and utilized in the isomerization process of the present invention. These refinery streams containing a minor quantity of isomerizable olefins are obtained from petroleum refineries and from the various petrochemical installations including thermal cracking units, catalytic cracking units, thermal reforming unit, coking units, polymerization units, dehydrogenation units, etc. Such refinery streams have in the past been burned for fuel value since economical process for the utilization of their hydrocarbon and olefin content has not been available. This is particularly true of the commonly encountered off-gas streams.

As previously noted, the foregoing isomerizable mono-olefins can contain appreciable amounts of diolefins which are readily polymerizable under conditions utilized in the traditional prior art processes. These diolefins are commonly analogous to the corresponding mono-olefin in that they contain the same number of carbon atoms but contain an additional double bond. Examples of such polymerizable diolefins are propadiene, 1,2-butadiene, 1,3-butadiene, 2-methyl-1,3-butadiene (isoprene), 2,3-dimethyl - 1,3 - butadiene (methylisoprene), 1,3-pentadiene (piperylene), 2,4,-hexadiene. Particularly readily polymerizable are the conjugated dienes but it is within the scope of the present invention to include the non-conjugated dienes and trienes, etc. Also included within the scope of this invention are the polymerizable acetylenic hydrocarbons such as acetylene, methylacetylene, ethylacetylene, etc.

The catalytic composite to be utilized in the process of the present invention comprises a crystalline aluminosilicate of the type hereinafter described. As is well known to those cognizant of the catalytic art, crystalline aluminosilicates, otherwise known as molecular sieves or zeolites, are composed of a three dimensional inter-connecting structure of silica and alumina tetrahedra. These tetrahedra are formed by four oxygen atoms surrounding a silicon or aluminum atom with oxygen atoms providing the basic linkage between the tetrahedra. These tetrahedra are arranged in an orderly structure to form inter-connecting cavities or channels of uniform size interconnected by uniform openings or pores. The ion exchange capabilities of these zeolitic materials stems from the trivalent nature of aluminum which causes the alumina tetrahedra to be negatively charged allowing the association of cations with the tetrahedra to maintain a balanced electrical charge within the tetrahedron structure. The molecular-sieve property of these materials derives from their uniform pore size which can be correlated with the size of the molecules and thus used to separate molecules having a critical diameter less than or approximately equal to the size of the pore mouths of the crystalline aluminosilicate. To be an effective catalytic composite in the process of this invention, the crystalline aluminosilicate must have pores of sufficient diameter to allow the passage of the reactants and desired products therethrough. Thus, a requirement of the crystalline aluminosilicate utilized in the process of the present invention is to have pore mouth openings of about 5 to about 15 angstroms units and of sufficient diameter to allow the passage of the particular mono-olefin to be isomerized and its corresponding isomer therethrough. In other words the pore mouths must have a diameter greater than the critical diameter of the particular mono-olefin and its isomers.

Crystalline aluminosilicates possessing the foregoing pore opening requirements are well known to those trained in the art. Preferred species include zeolite "A," zeolite "X," and zeolite "Y" and mordenite. A detailed description of applicable aluminosilicates regarding their composition and method of preparation can be found in U.S. Pats. 2,971,903, 2,972,643 or 3,140,322 or in the various publications of R. M. Barres such as Endeavour, 23, No. 90, September 1964, pp. 122-130.

Particularly preferred crystalline aluminosilicates are zeolite A and zeolite X.

Briefly, zeolite A in its sodium hydrated form is characterized by the formula:

$$Na_{12}(ALO_2)_{12}(SiO_2)_{12}.27H_2O$$

Upon removal of the water molecules, molecular sieve characteristics are acquired with pore openings of about 4 Angstrom units in diameter. Ion exchange of the sodium ions with calcium ions (1 calcium per 2 sodium) results in pore openings of about 5 angstroms. Because of these small pore openings these type A zeolites are suited for use in the process of the present invention only when the isomerizable olefin and its isomer are linear since branched chain olefins will not pass through the pore openings.

To accommodate branched chain olefins and offer free passage of the linear species, a crystalline sodium aluminosilicate of type X is available with pore openings of about 13 angstrom units. This aluminosilicate, known commercially as "Molecular Sieve 13 X" is characterized by the formula:

$$Na_{86}(ALO_2)_{86}(SiO_2)_{106}.267H_2O$$

Dehydration yields an active catalytic composite. Replacement of the sodium ions (at a 2 sodium for 1 calcium replacement ratio) yields an aluminosilicate with pore openings about 10 angstroms and known commercially as "Molecular Sieve 10X."

As previously mentioned, it is essential that the crystalline aluminosilicate utilized in the process of the present invention have a portion and preferably at least 20% of its cation content (mole basis) supplied by copper or zinc. Particularly preferred composites have at least 20% but less than 100% copper or zinc cation content with the remainder supplied by an alkali metal or alkaline earth cation. Specifically preferred are copper-calcium composites. These compositions are attainable by ion exchange methods well known to the art. Preferably the copper or zinc is introduced by contacting alkali metal or alkaline earth crystalline aluminosilicate, typically the readily commercially available sodium or calcium forms, with an aqueous solution of a copper or zinc salt.

By controlling the contact time, temperature and solution concentration by means known to the art the extent of ion exchange (copper or zinc replacement) can be regulated. After such treatment, the exchanged crystalline aluminosilicate is water washed and calcined to render it effective as a catalytic composite for utilization in the process of the present invention.

The process of the present invention for isomerizing isomerizable olefins present in admixture with polymerizable diolefins is effected by contacting the olefin with a catalyst of the type hereinbefore described in an olefin isomerization zone. This contacting may be accomplished by utilizing the catalyst in a fixed bed system, a moving bed system, a fluidized bed system or a batch type operation. Preferred for operational advantages is a fixed bed system. In addition the olefin may be isomerized in the presence of inert diluents such as hydrogen, nitrogen, argon, etc. In the preferred fixed-bed system, the olefin feedstock is brought to the desired hereinafter described isomerization conditions by any of the various heat exchange and/or compression means and contacted in a conversion zone containing the fixed catalyst bed in either an upward, downward or radial flow fashion. This reaction zone may consist of one or more reactors with appropriate heat exchange means therebetween. The isomerized product is continuously withdrawn, separated from the reactor effluent and recovered by conventional means such as fractional distillation while the unreacted starting material may be recycled to form a portion of the feedstock.

As in the instance of the catalytic composite to be utilized in the process of the present invention, the isomerization conditions to be utilized in effecting the present isomerization reaction without inducing substantial polymerization (i.e. greater than about 50%) of the diolefins contained therein, are critically important. This requires an isomerization temperature of about 0° F. to about 200° F. and preferably of about 50° F. to about 150° F. Reaction pressure is not as critical as the reaction temperature and can vary from atmospheric to 100 atmospheres or more. In any event, it is particularly preferred to correlate the isomerization reaction temperature and pressure to maintain the majority and in particular, the entire olefin feedstock in the liquid phase. However, it is within the scope of the present invention to contact the diolefin containing monoolefin in either the vapor or liquid-vapor phase within the foregoing temperature requirements. Use of appreciably higher temperatures will cause polymerization of greater amounts of the diolefin and possibly polymerization of the mono-olefin, particularly if the mono-olefin has a tertiary structure.

The hydrocarbon feed is contacted with the catalyst at a liquid hourly space velocity sufficient to effect the reaction such as about 0.1 hr.$^{-1}$ to about 10 hr.$^{-1}$.

EXAMPLE

The following example is presented to illustrate the preparation of the described catalytic composites and their use in the process of the present invention. However, this example is not to be construed as limiting the scope of this invention but is merely presented to illustrate the embodiments of the present process.

Commercially available type X zeolites in the calcium form ("Molecular Sieve 10X") were ion-exchanged with various cations to varying degrees by slowly adding an aqueous solution containing the desired cation to 10X sieves in a 20–40 mesh size range contained in an Erlenmeyer flask. The resulting mixture was rotated mechanically for 30 minutes at 25° C. The mixture was then washed and filtered three times. The sieves were then activated by heating at 100–150° C. for approximately 45 minutes and at 350° C. for two hours while under a constant nitrogen purge.

To test the resulting sieves as isomerization catalytic composites 15 grams of the particular sieve to be evaluated were placed in 80 ml. glass bomb containing 15 ml. of an 85% 2-methylbutene-1-15% isoprene hydrocarbon mixture. The bomb was agitated at 25° C. for 2 hours with the resultant liquid product being analyzed by gas-liquid cromatography. Presented in the following table are the specific sieves tested and results obtained.

with copper. Increasing the amount of copper present in the sieve lowered the amount of polymer produced as compared to cations like mercury which increased the amount of polymers produced with increased cation exchange. However, the increased copper cation content also lowered the isomerization activity of the catalyst. Thus, a particularly preferred catalytic composite comprises at least a 20% copper cation content but less than a 100% copper cation content. It is preferred to have the remaining cation content provided by an alkaline earth metal, particularly calcium, to enhance the isomerization activity with the copper or zinc cation preferably copper, suppressing the polymerization activity.

The foregoing detailed description and example are presented to help clarify the process of this invention. Modification by those trained in the art are within the scope of the present invention which is to be limited only by the apprehended claims.

We claim as our invention:

1. A process for the isomerization of an isomerizable mono-olefin in admixture with a diolefin, without substantial polymerization of said diolefin, which comprises contacting said mixture at a temperature of about 0° F. to about 200° F. with a catalytic composite consisting essentially of a crystalline aluminosilicate zeolite having uniform pore openings of about 5 to about 15 angstrom units and of sufficient diameter to allow the passage of said mono-olefin and its isomer therethrough, said aluminosilicate being further characterized in that at least 20% of the cation content thereof is provided by copper or zinc.

2. The process of claim 1 further characterized in that said aluminosilicate is a type X zeolite.

3. The process of claim 1 further characterized in that said aluminosilicate is prepared by cation exchange with the calcium form of a type X zeolite.

4. The process of claim 3 further characterized in that said cation is copper.

5. The process of claim 1 further characterized in that the majority of said olefin and diolefin is maintained in the liquid phase.

6. The process of claim 1 further characterized in that said mono-olefin is a methylbutene and said; diolefin is isoprene.

7. The process of claim 1 further characterized in that said mono-olefin is a butene and said diolefin is butadiene.

8. The process of claim 7 further characterized in that said aluminosilicate is a type A zeolite and said butene is a n-butene.

9. The process of claim 1 further characterized in that said cation content is provided by copper.

| Cation | 10X (Ca) | Co | Ba | Cu | Cu | Zn | Fe | Ni | Sr | Hg | Hg |
|---|---|---|---|---|---|---|---|---|---|---|---|
| Percent exchange |  |  |  | 53 | 100 | 32 | 100 | 43 | 72 | 87 | 100 |
| 2-methylbutene-1, wt. percent | 22.1 | 8.1 | 12.1 | 50.8 | 67.2 | 46.2 | 8.5 | 16.0 | 9.8 | 7.3 | 4.3 |
| 2-methylbutene-2, wt. percent | 60.8 | 69.1 | 71.5 | 33.0 | 15.8 | 33.7 | 59.9 | 56.6 | 61.2 | 67.5 | 44.2 |
| Isoprene, wt. percent | 5.9 | 4.7 | 5.1 | 11.6 | 13.7 | 13.4 | 3.6 | 5.2 | 4.5 | 2.4 | .4 |
| Unknown, wt. percent | 0 | .5 | 0 | 1.1 | .2 | 1.3 | 1.2 | 25 | 1.2 | 1.2 | 1.6 |
| Polymer, wt. percent | 11.2 | 17.6 | 11.3 | 3.5 | 3.1 | 5.4 | 26.8 | 19.7 | 23.3 | 21.6 | 49.5 |

From the foregoing table, the beneficial, unexpected import of the process of the present invention is readily ascertainable by those trained in the art. Of the nine specific cations tested at equivalent reaction conditions, all showed isomerization activity but only two, namely, copper and zinc showed any isomerization activity for the mono-olefin without substantial formation of polymeric material via polymerization of the diolefin, isoprene. Calcium produced polymer in at least twice the amount as copper or zinc produced. Mercury produced polymer in an amount in order of magnitude greater than copper or zinc and even polymerized an appreciable amount of the mono-olefin in addition to the polymerization of the diolefin. Particularly noteworthy are the results obtained References Cited

UNITED STATES PATENTS 3,367,885 2/1968 Rabo et al. _____ 208—46 MS
3,331,767 7/1967 Arey et al. _____ 208—46 MS
3,140,322 7/1964 Frilette et al. _____ 208—46 MS
2,971,904 2/1961 Gladrow et al. ____ 208—46 MS DELBERT E. GANTZ, Primary Examiner V. OKEEFE, Assistant Examiner U.S. Cl. X.R.

260—681.5